No. 892,895. PATENTED JULY 7, 1908.
S. ROSE.
SAW.
APPLICATION FILED JULY 10, 1907.

3 SHEETS—SHEET 3.

WITNESSES
J. A. Brophy
John K. Brackvogel

INVENTOR
Sage Rose
BY Munn & Co
ATTORNEYS

UNITED STATES PATENT OFFICE.

SAGE ROSE, OF NEW ORLEANS, LOUISIANA.

SAW.

No. 892,895.

Specification of Letters Patent.

Patented July 7, 1908.

Application filed July 10, 1907. Serial No. 382,999.

*To all whom it may concern:*

Be it known that I, SAGE ROSE, a citizen of the United States, and a resident of New Orleans, in the parish of Orleans and State of Louisiana, have invented a new and Improved Saw, of which the following is a full, clear, and exact description.

This invention relates to saws, and more particularly to rotary saws used for felling trees.

The object of the invention is to provide a rotary saw mounted upon a suitable transportable frame, and adapted to be operated manually or by a driving motor such as an explosive engine or the like.

A further object of the invention is to provide a rotary saw movably carried upon a transportable frame and arranged to be projected against a tree trunk.
A still further object of the invention is to provide a device of the class described, consisting of a transportable frame adapted to be arranged at the trunk of a tree, and having a rotary saw adjustably carried thereupon so that it can be projected against the tree trunk at an angle with the horizontal, and provided with suitable driving means for operating the saw.

An additional object of the invention is to provide a tree-felling device including a rotary saw adjustably mounted at an angle with the horizontal, and arranged to cut into the tree trunk close to the ground and at an angle with the length of the trunk.
The invention consists in the construction and combination of parts to be more fully described hereinafter and particularly pointed out in the claims.

Figure 1:
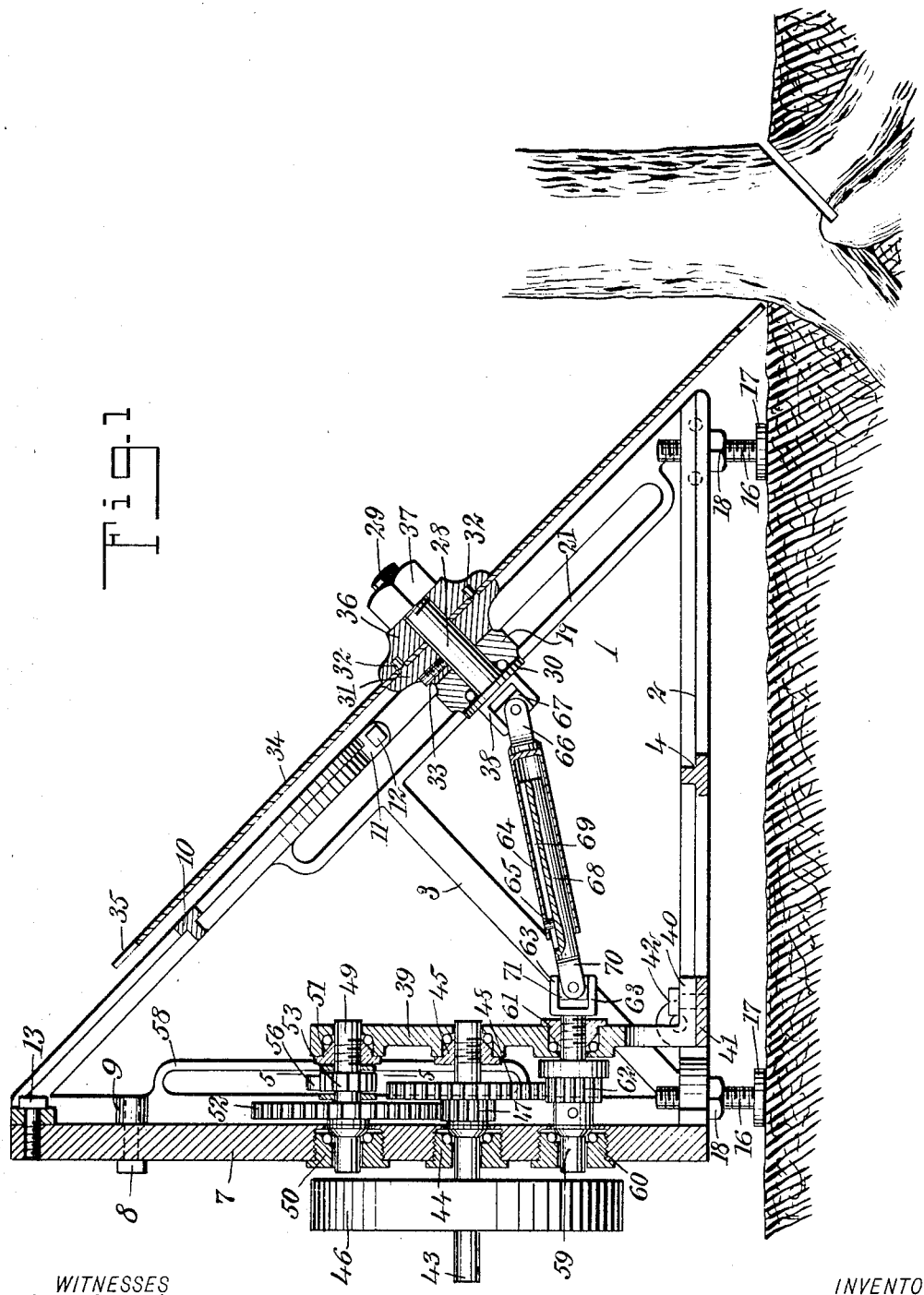
Figure 2:
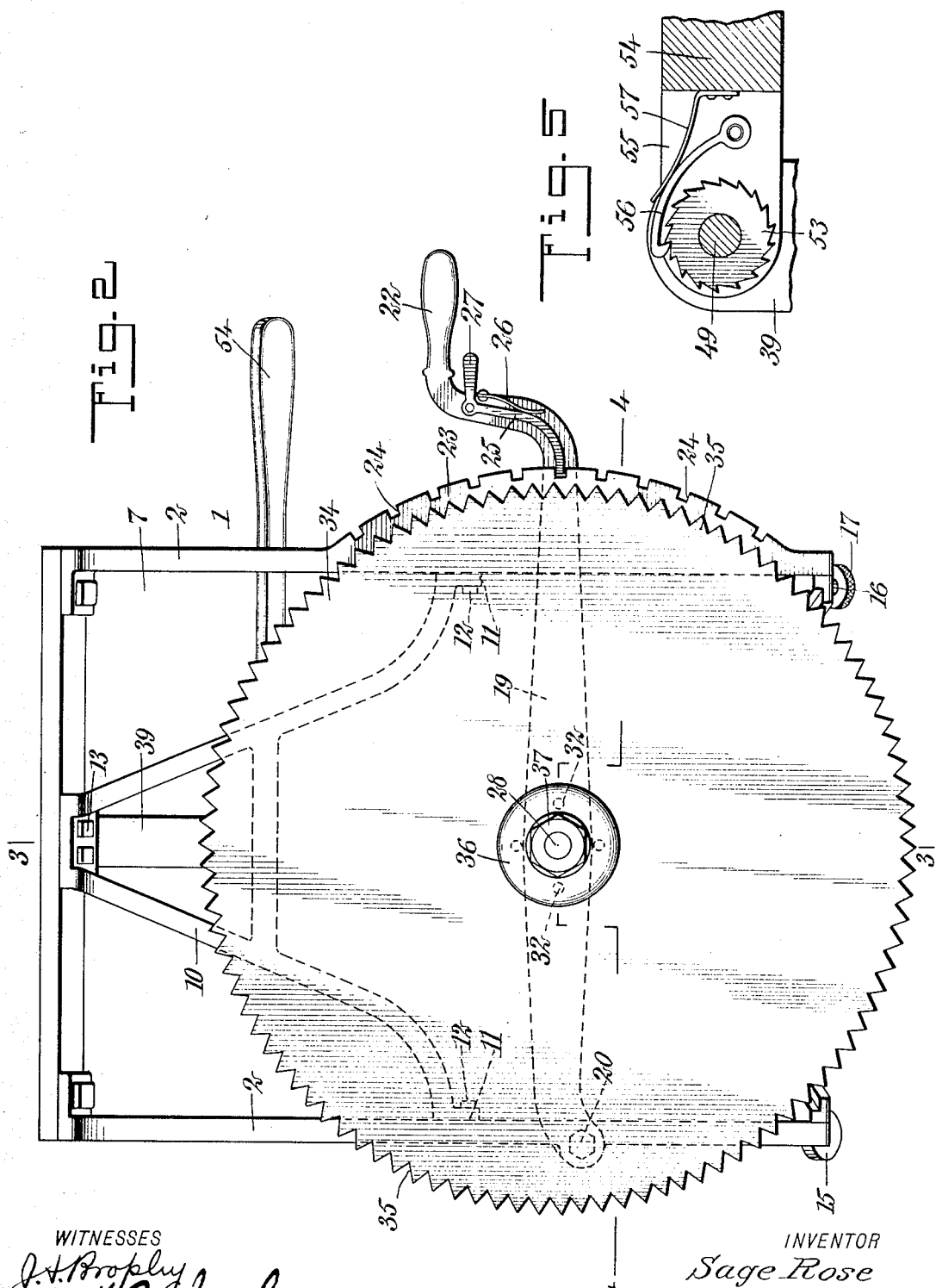
Figure 3:
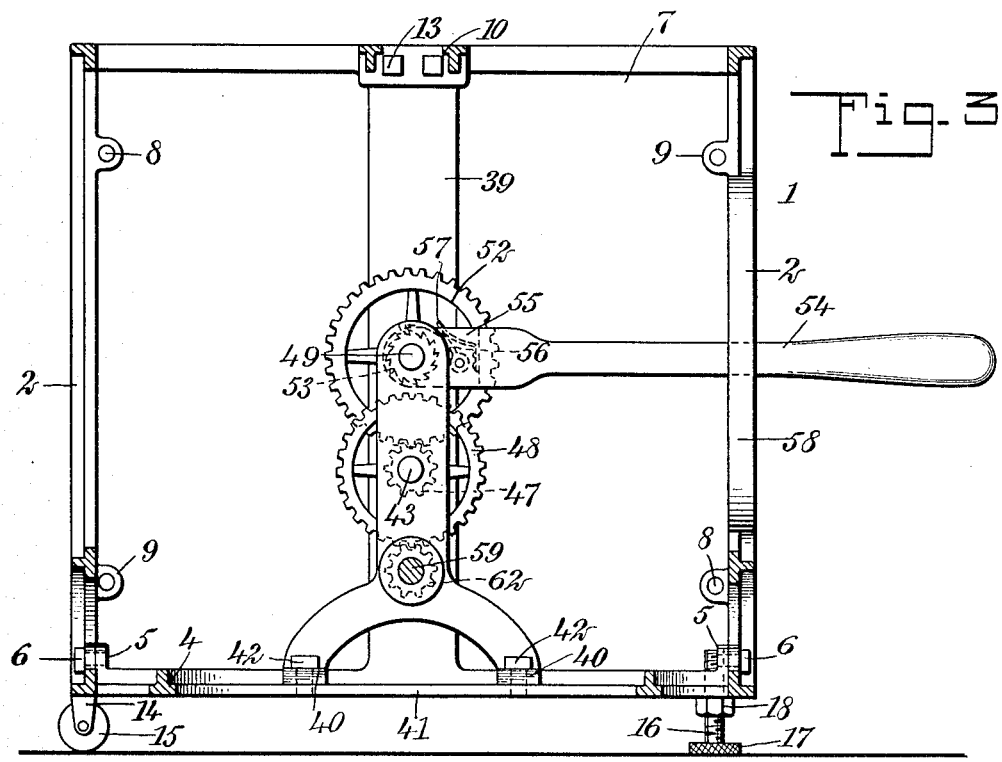
Figure 4:
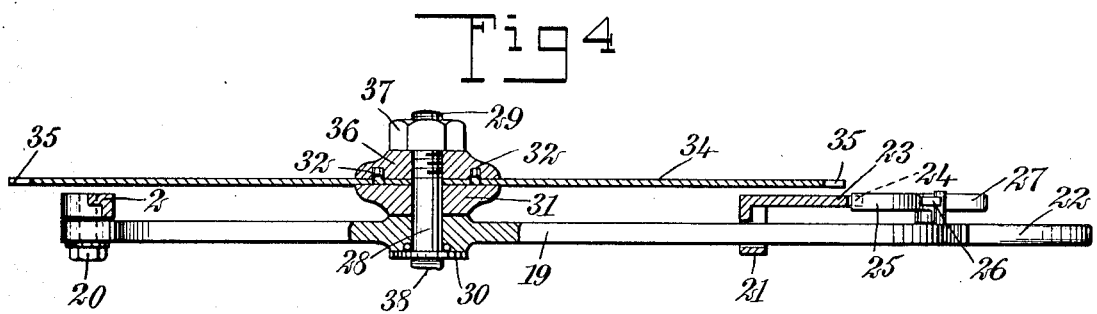

Reference is to be had to the accompanying drawings forming a part of this specification, in which similar characters of reference indicate corresponding parts in all the views, and in which Figure 1 represents a vertical section through the device, showing the saw in position adjacent to a tree trunk and arranged to cut into the latter close to the ground to sever the same; Fig. 2 is a view taken perpendicularly to the plane of the saw; Fig. 3 is a section on the line 3—3 of Fig. 2, showing the actuating mechanism; Fig. 4 is a cross-section on the line 4—4 of Fig. 2; and Fig. 5 is a section on the line 5—5 of Fig. 1.

Before proceeding to a more detailed ex-
planation of my invention it should be understood that while the saw, as such, is applicable to a number of uses the primary object of the invention is to provide a device of the class described particularly useful in the cutting down or felling of trees or other timber. To accomplish this purpose I provide a transportable frame which can be conveniently moved about from place to place and which has standards or supports permitting the frame to be leveled and adjusted to suit irregularities of the ground. Movably mounted upon the frame upon a carreir is a rotary saw carried at an angle with the horizontal, preferably of 45°. The saw is arranged to be projected beyond the frame, against the tree trunk to cut into the same for the purpose of severing it, and has means whereby the saw can be held in a plurality of positions as the cut into the tree advances. The frame carries actuating mechanism connected with the saw by means of a flexible shaft. The actuating mechanism can be manually operated or can be suitably connected with a motor, such as a gas engine or other prime mover. As the position of the saw relative to the actuating mechanism is constantly being changed as the work progresses, I provide a shaft connection between the saw and the driving means, which is not only flexible but is extensible as well.

Referring more particularly to the drawings, 1 represents a transportable frame preferably formed from cast-iron or other suitable material. The transportable frame comprises side-members 2 substantially triangular in form and having two of the sides at right angles with respect to one another and including transverse bracing members 3. The bases of the triangular side members are joined by an inverted T-shaped brace 4 having toes 5 at its extremities, secured in position upon the side members 2 by means of screws or bolts 6. The vertical sides of the members 2 are joined by a back plate 7 held in position rigidly upon the sides by means of screws or bolts 8 engaging suitable threaded openings in lugs 9 integral with the side members. The inclined sides of the members 2 are normally at an angle of substantially 45° and are joined by an A-shaped brace 10, having its opposite ends provided with toes 11 mounted upon the sides by means of screws or bolts 12, and secured to the back-plate near the upper edge thereof by means of screws or bolts 13. One of the side members 2 at the lower edge has bearing brackets 14, which carry supporting wheels or rollers 15. The corresponding edge of the opposite side member 2 has threaded openings in which are mounted similarly threaded adjustable supports 16, having heads 17 and adjusting nuts 18 on the threaded shanks thereof. By means of the supports 16, the frame can be leveled or otherwise adjusted to allow for irregularities of the ground adjacent to the tree which is being felled.

A swinging saw carrier 19 is pivotally mounted at one end by means of a bolt 20, upon the inclined side of one of the side members 2 and extends to the opposite side member 2, being arranged in a guide-way or slot 21 integral with the inclined side. Beyond the guide-way 21 the carrier has an offset handle 22 by means of which it may be swung about its pivotal point for purposes of adjustment. Adjacent to the guide-way 21 the inclined side of the side member 2 has an extension 23, constituting a segment and provided with a plurality of notches 24. Near the handle, the saw carrier has a pivoted dog 25 normally pressed into engagement with the segment 23 by means of a spring 26, and presenting adjacent to the handle 22 an arm 27, by means of which it can be swung out of or into engagement with the segment, by the hand of the operator grasping the handle 22. A spindle 28 having a threaded extremity 29 and a head 30, is mounted in one of suitable openings of the saw carrier with the head engaging the under side thereof. A collar 31 presenting pin projections 32, is mounted upon the spindle 28 and is held in position by means of a set-screw 33. A saw blade 34, having saw teeth 35, is mounted upon the spindle and rests against the collar 31, the saw blade having suitable openings to permit the projection therethrough of the spindle and the pins 32. A second collar 36 is arranged upon the spindle and has recesses engaging the pins 32. A nut 37 is screwed upon the threaded extremity 29 and serves to force the collars together, holding the saw firmly therebetween and mounting the same rigidly upon the spindle. Beyond the head 30, the spindle 28 has a universal joint socket 38.

Adjacent to the back plate 7 but spaced therefrom, is an upright 39 having the lower end bifurcated and presenting feet 40 mounted rigidly upon a cross-bar 41 by means of screws or bolts 42. The cross bar is carried by the lower sides of the side members 2. A driving shaft 43 is mounted in suitable ball bearings 44 and 45 carried by the back plate and the upright, respectively. The driving shaft 43 has a fly-wheel 46 at the rear face of the back plate 7, and between the latter and the upright 39 a rigid pinion 47 and a gear-wheel 48. Above the driving shaft 43 a second shaft 49 is mounted in suitable ball bearings 50 and 51 carried respectively, by the back plate and the upright. The shaft 49 has a gear wheel 52 in mesh with the pinion 47 and is provided with a ratchet 53. A hand lever 54 has a forked extremity 55 loosely mounted upon the shaft 49 and at opposite sides of the ratchet 53. Between the sides of the bifurcated end 55 the hand lever has a dog 56 normally pressed into engagement with the ratchet 53 by means of a spring 57. The hand lever extends through a guide-way or slot 58 integral with the vertical side of one of the side members 2 and projects laterally beyond the frame. Below the shaft 43 a further shaft 59 is suitably mounted in ball bearings 60 and 61 of the back plate and the upright respectively, and carries a rigid pinion 62 in mesh with the gear-wheel 48 of the driving shaft 43. Beyond the upright 39 the shaft 59 presents a socket 63 of a universal joint.

I provide a hollow shaft member 64 having an inwardly projecting pin 65, and at one extremity a socket 66 of a universal joint. A block 67 is pivotally mounted in the sockets 66 and 38 respectively and constitutes therewith a universal joint. A second shaft member 68 having an elongated groove 69, is slidably mounted within the member 64. The projection 65 engages the groove 69 and prevents the rotation of each of the members with respect to the other. At the outer end, the second shaft member 68 has a universal joint socket 70. A block 71 is pivotally mounted in the sockets 70 and 63 respectively, and constitutes therewith a universal joint.

The driving shaft 43 can be operatively connected in any suitable manner with a prime mover, for instance by means of belting to the fly-wheel 46, and serves to operate the saw through the gear-wheel 48, the pinion 62 and the universal joint shaft. It will be understood that as the saw is moved upon the frame, the position of the saw with respect to the actuating mechanism changes. As the distance between the saw and the actuating mechanism increases, allowance is made for the increase by the extensible shaft, the members 64 and 68 of which are relatively slidable. At the same time the altered position of the saw with respect to the actuating mechanism does not affect the operation, as the universal joints of the flexible shaft permit the transmission of the rotation of the driving shaft 43 to the spindle 28 in substantially any relative position of the parts. If it is desired to operate the saw manually, the hand lever 54 is employed. By reciprocating the hand lever back and forth within the guide-way 58, a movement of rotation in one direction is imparted to the shaft 49 by means of the ratchet 53 and the dog 56. When the hand lever is moved in one direction the ratchet is operatively engaged by the dog 56 to rotate the shaft 49. During the return movement of the hand lever the dog slides inoperatively along the teeth of the ratchet, and the shaft 49 is free to continue its rotation in the same direction, a further impulse being given thereto by the succeeding movements in the opposite direction of the hand lever.

To use the device, the frame is placed upon the ground adjacent to the trunk of the tree, and is adjusted by means of the supports 16 to assume a position with the lower side of the side members 2 substantially horizontal. The rotary saw which is at an angle with the horizontal, of preferably 45°, is projected by means of the saw carrier into engagement with the trunk of the tree, as close to the ground as possible. The driving mechanism is then operated to rotate the saw, which rapidly cuts its way into the bole of the tree. As the depth of the cut increases, the saw is projected further by means of the saw carrier, which can be held in a plurality of positions by means of the segment 23 and the dog 25. The saw is allowed to advance to approximately the middle of the tree trunk and is then withdrawn. The frame is thereupon moved around to another side of the tree trunk and a second inclined cut is made in the same; two such inclined cuts at opposite sides of the tree trunk are usually sufficient for the felling of a tree. If the latter is of great size it may be necessary to make three or more cuts, depending upon the diameter of the bole. By judiciously selecting the points of severance and the location of the cuts, the tree can be easily felled in a direction opposite to the last position of the saw and thereby the latter is not endangered by the falling of the tree.

By means of my saw it is possible to sever timber so close to the ground that there is absolutely no stump wastage. Furthermore, in many cases this does away with the arduous labor of subsequent stump pulling and leaves the land in good condition for cultivation.
It will be understood the train of gears between the hand lever and the flexible shaft, constitutes a speeding-up mechanism by means of which a comparatively slow movement of the lever is converted into a far more rapid rotary movement of the saw.

Having thus described my invention I claim as new, and desire to secure by Letters Patent:

1. In a device of the class described, in combination, a movable supporting frame having a frame member inclined to the horizontal, a saw carrier mounted upon said frame member, means for holding said carrier in a plurality of positions, a rotary saw mounted upon said carrier and arranged to revolve in a plane parallel to the plane of movement of said carrier, and means for operating said saw.

2. In a device of the class described, in combination, a movable supporting frame having a frame member inclined to the horizontal, a saw carrier mounted to swing upon said frame member, means for holding said carrier in a plurality of positions, a rotary saw mounted upon said carrier and arranged to revolve in a plane parallel to the swinging plane of said carrier, and saw-driving mechanism adapted to be operated by a prime mover.

3. In a device of the class described, in combination, a movable supporting frame having frame members inclined to the horizontal, a saw carrier pivotally mounted upon one of said frame members, and arranged to swing upon another of said frame members, means for holding said carrier in a plurality of positions, a rotary saw mounted upon said carrier, driving mechanism for said saw, and a flexible connection between said saw and said driving mechanism.

4. In a device of the class described, in combination, a movable supporting frame having frame members, inclined to the horizontal a saw carrier pivotally mounted upon one of said members, means for holding said carrier in a plurality of positions, a rotary saw mounted upon said carrier in a plane substantially parallel to said inclined frame members, and driving means for operating said saw.

5. In a device of the class described, in combination, a movable supporting frame having frame members, inclined to the horizontal a saw carrier pivotally mounted upon one of said members, means for holding said carrier in a plurality of positions, means for guiding said carrier upon said frame, a rotary saw mounted upon said carrier in a plane substantially parallel to said inclined frame members, and driving means for operating said saw.

6. In a device of the class described, in combination, a movable supporting frame having frame members, inclined to the horizontal a saw carrier pivotally mounted near one end upon one of said inclined frame members, another of said inclined frame members having a guide engaging said carrier, means for holding said carrier in a plurality of positions, a rotary saw mounted upon said carrier in a plane substantially parallel to said inclined frame members, driving means, and a flexible, extensible shaft connecting said saw and said operating means.

7. In a device of the class described, in combination, a movable supporting frame having frame members, inclined to the horizontal a saw carrier pivotally mounted near one end upon one of said frame members, another of said frame members having a guide-slot engaging said carrier and presenting a notched segment, said carrier having a dog adapted to engage said notched segment to hold said carrier in a plurality of positions, a spindle mounted upon said carrier, a rotary saw rigid with said spindle, driving means, and a universally jointed extensible shaft connecting said driving means and said spindle.

8. In a device of the class described, in combination, a transportable supporting frame having frame members, inclined to the horizontal adjusting means for said frame, a saw carrier pivotally mounted near one end upon one of said inclined frame members, means for guiding said carrier, means for holding said carrier in a plurality of positions, a spindle mounted upon said carrier, a rotary saw rigid with said spindle, said spindle being arranged at substantially right angles to the plane of said inclined frame members, driving means, and an extensible shaft universally jointed to said spindle and said driving means, respectively.

9. In a device of the class described, in combination, a transportable frame, means for adjusting said frame, a saw carrier adjustably mounted upon said frame, means for holding said carrier in a plurality of positions, a rotary saw mounted upon said carrier, a shaft, a hand lever, means for operatively connecting said hand lever and said shaft when said hand lever is moved in one direction, a second shaft, means for operatively connecting said shaft, and a flexible, extensible shaft connecting said rotary saw and said second shaft.

10. In a device of the class described, in combination, a transportable frame, a movable saw carrier upon said frame, means for holding said saw carrier in a plurality of positions, a spindle mounted upon said saw carrier, a rotary saw rigid with said spindle, a shaft having a ratchet, a hand lever loosely mounted upon said shaft and having a dog operatively engaging said ratchet when said hand lever is moved in one direction, a second shaft, an extensible shaft universally jointed to said second shaft and said spindle, respectively, and a train of speeding-up gears connecting said first shaft and said second shaft.

11. In a device of the class described, in combination, a transportable frame, an adjustable saw carrier upon said frame, a spindle mounted upon said saw carrier, a rotary saw rigid with said spindle, said spindle being arranged at an angle with the horizontal, a plurality of shafts carried by said frame, one of said shafts having a gear wheel and a ratchet, a hand lever having a dog operatively engaging said ratchet when said hand lever is moved in one direction, the second of said shafts having a gear wheel, and a pinion engaging said gear wheel of said first shaft, the third of said shafts having a pinion engaging the gear wheel of the second of said shafts, a flexible, extensible shaft connecting the third of said shafts and said spindle, and means for operatively connecting one of said shafts with a prime mover.

In testimony whereof I have signed my name to this specification in the presence of two subscribing witnesses.

SAGE ROSE.

Witnesses:
L. L. LABATT,
C. H. GOEBEL.